Patented Aug. 12, 1941

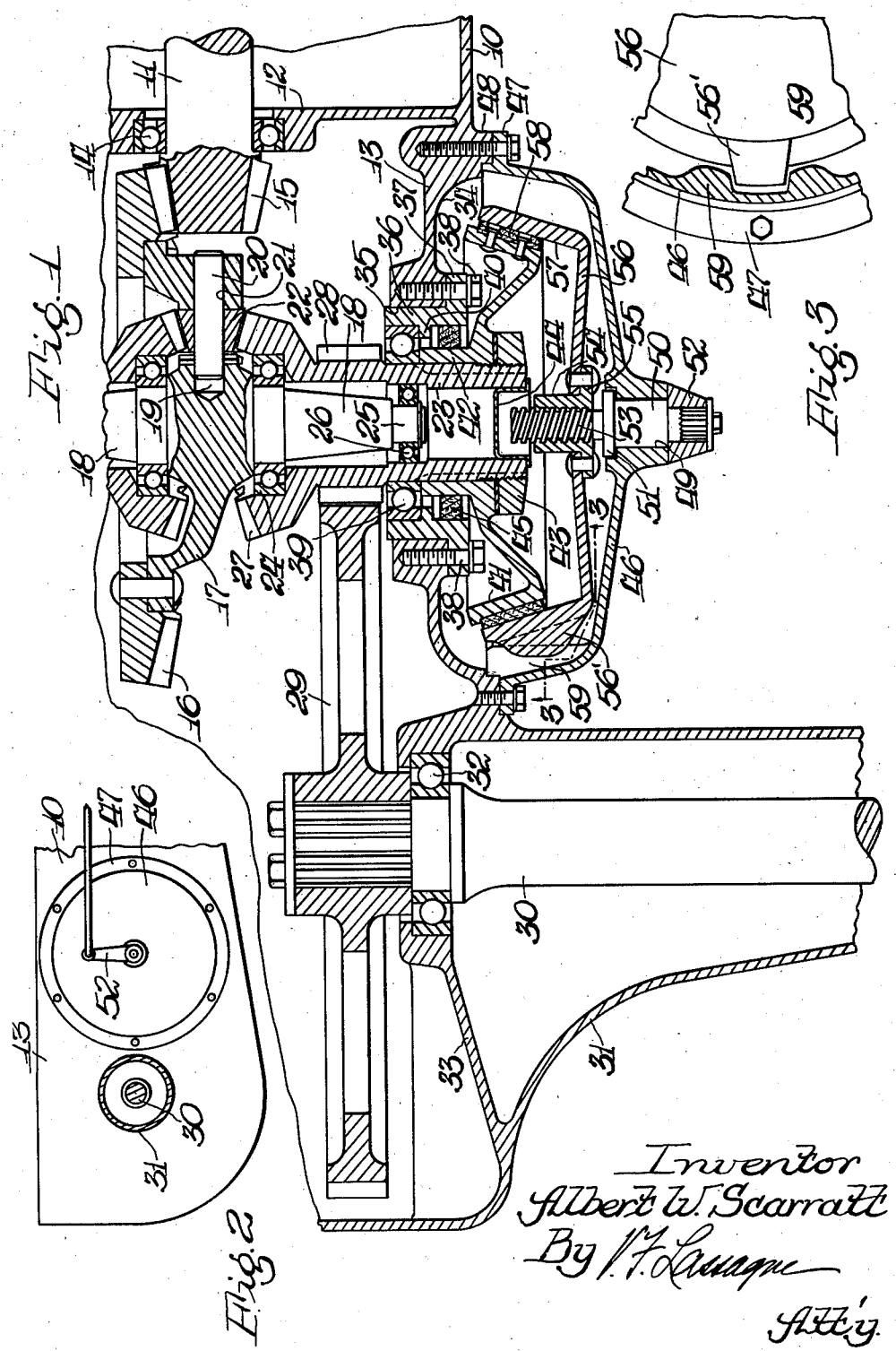

2,252,355

UNITED STATES PATENT OFFICE 2,252,355

BRAKE

Albert W. Scarratt, Kenilworth, Ill., assignor to International Harvester Company, a corporation of New Jersey Application April 3, 1937, Serial No. 134,726

2 Claims. (Cl. 188—71)

This invention relates to a final drive and brake construction for tractors. More specifically, it relates to a conical brake for a counter-drive shaft.

The object of the invention is to provide novel brake construction particularly adapted for the counter-drive shaft of tractors. Another object is to provide a brake construction of a novel design in which a conical brake drum is moved axially to engage a conical friction member carried by a driven shaft.

The above objects and others which will be apparent from the detailed description to follow are accomplished by a construction in which a conical ring of friction material is carried by a conical brake shoe mounted on a driven shaft. A conical brake drum is mounted coaxially of the brake shoe and held by an abutment against rotation. A threaded member extending axially through a carrier for the brake drum engages a threaded hub on the brake drum whereby said drum may be moved in an axial direction into engagement by angular movement of the threaded member. Adjustment is taken care of by angularly adjusting the operating arm on the thread to compensate for wear of the friction material.

In the drawing:

Figure 1 is a transverse horizontal section showing the rear portion of a tractor embodying the invention. As both sides of the tractor are alike, only one side of the drive shaft and differential are shown in the drawing;

Figure 2 is a side elevation of the structure shown in Figure 1; and,

Figure 3 is an enlarged section on the line 3—3 of Figure 1 showing the abutments for holding the brake drum against rotation.

The portion of the tractor illustrated shows a cast rear frame, such as is used on agricultural tractors. The forward portion 10 houses the transmission, which has not been shown as it does not form a part of the present invention. A drive shaft 11 extends from the transmission casing through a transverse vertical dividing wall 12 into the other portion of the casing, which will be designated as the differential housing 13. Said shaft is carried in a ball bearing assembly 14 mounted in the wall 12. A pinion 15 formed on the end of the shaft 11 engages a bevel ring gear 16, which is mounted on the differential carrier 17.

Said carrier is of a particular design incorporating a pair of laterally extending stub shafts 18 integrally forged with the carrier 17. A plurality of radial bores 19 formed in the carrier 17 form sockets for shafts 20. Said shafts extend through bores 21 formed in the carrier 17 in axial alignment with the bores 19. Pinions 22 are mounted on the shafts 21 in openings formed between the center and the outer portion of the carrier in the vicinity of the bores 19 and 21. Although only one of the shafts and differential pinion units is shown, it is understood that there are a plurality of them arranged in radially spaced position, as is conventional in differential construction.

Hollow shafts 23 are positioned over the stub shafts 18 concentrically with respect thereto. Each of the hollow shafts 23 is provided adjacent the differential carrier 17 with a recess in which a ball bearing assembly 24 is fitted. The inner race of said assembly is fitted on a shoulder formed on the stub shaft 18 adjacent the central portion of the differential carrier 17. The stub shaft 18 is provided with a reduced diameter outer end portion 25 on which a ball bearing assembly 26 is mounted. The outer race of said assembly fits in a shouldered portion of the hollow shaft 23, providing a bearing at the outer end for the shaft 18.

The inner end of the shaft 23 is provided with a beveled gear 27 which meshes with the pinions 22. Near its central portion, the shaft 23 is provided with a gear 28 integral therewith in the form disclosed which engages a drive gear 29. The gear 29 is the final drive for the tractor and is mounted on an axle shaft 30. Said shaft extends laterally outwardly through an axle housing 31. A ball bearing assembly 32 is shown for rotatably supporting the inner end of the axle shaft on a longitudinal vertical wall 33 of the axle housing structure.

The sides of the differential housing are formed with inwardly cupped walls 34, which provide supports for the drive shafts and also form portions of the brake chambers to be hereinafter described.

A large bore 35 is formed in the wall 34 concentric with respect to the hollow shaft 23. A sleeve 36 fitted in said bore is formed with a peripheral flange 37 which seats on the adjacent portion of the wall 34, being secured thereto by a plurality of cap screws 38.

The shaft 23 is rotatably mounted in the sleeve 36 by means of a ball bearing assembly 39. The ball bearing assembly is suitably mounted in a recess formed at the inner end of the sleeve 37 by an internal flange 40.

A conical braking member 41, which may be termed as a continuous brake shoe, is integrally formed with a sleeve-like hub 42. Said hub is internally splined and is fitted over the splined outer end of the hollow shaft 23 on the outside of the wall 34. The hub 42 abuts the outer end of the inner bearing race of the assembly 39. The race acts as a spacer to locate the brake member, and the brake member acts to hold the ball bearing assembly in position against a shoulder formed on the shaft 23. A nut 43 is threaded on the outer end of the hollow shaft 23 to hold the brake member in position against rotation on the shaft 23.

A flanged sheet metal cup 44 is fitted into the end of the hollow shaft 23 to shield the shaft against the escape of lubricant. Felt washers 45 are mounted in the annular space between the hub 42 and the interior of the sleeve 36 to prevent the escape of lubricant at that point. It will be understood, therefore, that the differential housing is sealed to prevent the escape of lubricant into the brake chamber. In addition to the cupped wall 34, the brake chamber is formed by a cupped cover plate 46. Said plate is formed as a casting for rigidity, although it might be formed by another method, and is provided with a peripheral flange 47, by which it is secured to an annular flange 48 formed on the side of the differential housing. A plurality of cap screws are shown for securing the cover plate 46 rigidly in position.

Coaxially with the shaft 23, the cover plate 46 is formed with a bore 49, through which a brake actuating shaft 50 extends. A thrust collar 51 on the shaft within the brake chamber fits against the inner wall of the plate to lock the shaft against movement in an outward direction. A brake actuating lever 52 is rigidly secured to the outer end of the shaft 50 for angularly adjusting the shaft, and at the same time holds it against axial movement in an inward direction.

Within the chamber, the shaft 50 is provided with a threaded end portion 53 of reduced diameter. Said portion rotatably fits into a threaded sleeve 54, which is secured by a flange 55 to a conical brake drum 56. Said brake drum is provided with a conical engaging face 57 adapted to contact a conical friction member 58 riveted onto the brake shoe member 41. The brake drum 56 is freely floating on the shaft 50 and is held against rotation by a lug 56' formed thereon, as best shown in Figure 3, and two spaced lugs 59 between which the lug 56' is positioned.

In the operation of a tractor drive and brake construction, as above described, power is supplied from the transmission to the drive shaft 11. From said shaft power is transmitted from the ring gear 16 to the differential carrier 17. The differential divides the power between the oppositely extending hollow drive shafts 23. The transversely spaced ball bearing assemblies 24 and 26 provide a satisfactory bearing for maintaining the stub shafts 18 and the hollow shafts 23 in running alignment.

From this point on, only one side of the drive and brake arrangement will be described, as the other side is an exact duplicate and has not been illustrated in the drawing. From the shaft 23 power is transmitted through the gear 28 to the drive gear 29 on the axle shaft 30. During operation of the tractor, the brake shoe 41 is in continuous rotation out of contact with the brake drum 36. When a brake is to be applied, the actuating lever 52, which may be controlled by a rod, as shown in Figure 2, or by any other suitable means, is moved angularly by angular rotation of the actuating shaft 50. The threaded end portion 53 is threaded into the sleeve carried by the brake drum. As the brake drum is held against rotation in either direction by the lugs 58 and 59, the threading movement acts to shift the brake drum inwardly axially of the shaft 50. This movement continues, depending upon the clearance between the contacting braking surfaces, until braking surface 57 engages the lining 58 on the shoe 41. The effectiveness of the brake depends upon the amount of axial movement of the drum, which in turn depends upon the angular movement of the actuating lever 52. To release the brake, the lever 52 is moved in the upper direction. This movement may be positive or may be by a spring connected at a suitable point to the brake actuating linkage. The threads, as shown, move the brake drum into engagement when the shaft is moved in a clockwise direction, looking at the tractor from the outer side of the brake drum. If it were desirable, the threads could be reversed for actuation by movement of the actuating lever in the opposite direction.

A unique feature of this construction is the ease by which the brake may be taken apart for inspection or repair by removing the cap screws around the cover plate 46. The brake drum is removed with the cover plate. It may then be removed from the shaft 50 by merely unthreading the hub sleeve 54 from the threaded end portion 53. The brake member or shoe 41 which carries the lining may be readily removed by unscrewing the nut 43 and slipping the member off axially. Due to the dust tight enclosure formed by the cover plate 46, dirt cannot enter the brake chamber in any appreciable amount. This is a very desirable feature in tractor design, as very dusty conditions are often encountered. The fact that very little dust enters the brake compartment makes the problem of sealing the transmission a simple one, as only the means need be provided to prevent escape of lubricant, as shown by the seal rings 45. The cup 44 in the end of the hollow shaft 23 is permanently pressed into position and need never be removed.

Although applicant has shown and described only one preferred embodiment of his improved final drive and brake construction for tractors, it is to be understood that he claims as his invention all modifications falling within the scope of the appended claims.

What is claimed is:

1. In a tractor having a cast rear frame structure, and in combination therewith, drive gearing including a laterally extending driving shaft projecting from the frame structure, said frame structure being formed with a depression around the shaft surrounded by a flange, a conical brake member mounted on said shaft, a rigid enclosure covering said brake member and cooperating with the depression in the frame structure to form a brake housing, said enclosure being secured to the flange of the frame structure, an operating shaft extending through said enclosure coaxially with the brake member, a conical brake drum mounted in the brake housing on and entirely carried by said operating shaft, means on the housing engageable with a portion of the drum for holding the drum against rotation with respect to the brake member, and means actuated by the operating shaft for moving the brake drum axially into engagement with the brake member.

2. In a tractor having a cast rear frame structure, and in combination therewith, drive gearing including a laterally extending driving shaft projecting from the frame structure, said frame structure being formed with a depression around the shaft surrounded by a flange, a conical brake member mounted on said shaft, a rigid enclosure covering said brake member and co-operating with the depression in the frame structure to form a brake housing, said enclosure being secured to the flange of the frame structure, an operating shaft rotatably carried against axial movement by said enclosure coaxially with the driving shaft, a conical brake drum mounted in the brake housing having a hub portion threaded on said shaft, said drum being entirely supported on said shaft, and means for holding the drum against rotation with respect to the brake member whereby rotation of the operating shaft moves the brake drum axially with respect to the brake member.

ALBERT W. SCARRATT.